US012618199B2

(12) United States Patent
Gomez Hernandez et al.

(10) Patent No.: US 12,618,199 B2
(45) Date of Patent: May 5, 2026

(54) METHOD FOR OBTAINING REINFORCED PACKAGING PAPER

(71) Applicant: CONSEJO SUPERIOR DE INVESTIGACIONES CIENTIFICAS (CSIC), Madrid (ES)

(72) Inventors: Nuria Gomez Hernandez, Madrid (ES); Priscilla Valeska Vergara Alarcon, Madrid (ES); Juan Carlos Villar Gutierrez, Madrid (ES)

(73) Assignee: CONSEJO SUPERIOR DE INVESTIGACIONES CIENTIFICAS (CSIC), Madrid (ES)

( * ) Notice: Subject to any disclaimer, the term of this patent is extended or adjusted under 35 U.S.C. 154(b) by 315 days.

(21) Appl. No.: 18/257,673

(22) PCT Filed: Oct. 27, 2021

(86) PCT No.: PCT/ES2021/070778
§ 371 (c)(1),
(2) Date: Jun. 15, 2023

(87) PCT Pub. No.: WO2022/129653
PCT Pub. Date: Jun. 23, 2022

(65) Prior Publication Data

US 2024/0150968 A1 May 9, 2024

(30) Foreign Application Priority Data

Dec. 18, 2020 (ES) ............................... ES202031267

(51) Int. Cl.

| | |
|---|---|
| ***D21H 27/10*** | (2006.01) |
| ***C13K 13/00*** | (2006.01) |
| ***D21H 19/12*** | (2006.01) |
| ***D21H 21/18*** | (2006.01) |

(52) U.S. Cl.
CPC .......... *D21H 27/10* (2013.01); *C13K 13/002* (2013.01); *D21H 19/12* (2013.01); *D21H 21/18* (2013.01)

(58) Field of Classification Search
CPC ..................................................... D21H 27/10
See application file for complete search history.

(56) References Cited

U.S. PATENT DOCUMENTS

| | | | |
|---|---|---|---|
| 3,585,104 A | 6/1971 | Kleinert | |
| 5,110,414 A | 5/1992 | Forss et al. | |
| 2002/0084045 A1 * | 7/2002 | Collias .................. | D21H 17/23 162/183 |
| 2020/0140658 A1 | 5/2020 | Nelson et al. | |

FOREIGN PATENT DOCUMENTS

| | | | |
|---|---|---|---|
| AU | 2018202592 | B2 | 10/2019 |
| CA | 2226746 | A1 | 12/1997 |
| CN | 102061642 | B | 5/2012 |
| CN | 102182112 | B | 10/2012 |
| CN | 104988783 | A | 10/2015 |
| EP | 3205672 | A1 | 8/2017 |
| WO | 9747702 | A1 | 12/1997 |
| WO | 2006027632 | A2 | 3/2006 |
| WO | 2016131828 | A1 | 8/2016 |

OTHER PUBLICATIONS

Bozell, Solvent fractionation of renewable woody feedstocks: Organosolv generation of biorefinery process streams for the production of biobased chemicals, Biomass and Bioenergy, 35, 2011, p. 4197-4208 (Year: 2011).*
Nechita et al., “Review on Polysaccharides Used in Coatings for Food Packaging Papers”, Review, 2020, vol. 10, No. 566, 24 Pages, Coatings.
Vergara et al., “Liquor re-use strategy in lignocellulosic biomass fractionation with ethanol-water mixtures”, Article, 2019, vol. 280, pp. 396-403, Bioresource Technology.
Shen et al., “Biopolymers for surface engineering of paper-based products”, Review Paper, 2014, vol. 21, No. 5, pp. 3145-3160, Cellulose.
International Search Report for Corresponding International Application No. PCT/ES2021/070778 and English Translation, 10 pages, Dec. 1, 2021.

* cited by examiner

*Primary Examiner* — Tabatha L Penny
(74) *Attorney, Agent, or Firm* — Hayes Soloway PC

(57) ABSTRACT

A method for obtaining a reinforced packaging paper includes applying a residual liquor from the pretreatment of lignocellulosic waste with a water-alcohol mixture to a packaging paper and subsequently drying the paper. The residual liquor has a solid fraction in suspension of 1-70% by weight/volume relative to the total, with lignin and lignin-carbohydrate complexes. The liquor also has a liquid fraction of 30-99% by weight/volume relative to the total, containing glucose between 0.04 and 2.07 g/L, xylose between 0.31 and 14.57 g/L, arabinose between 0.09 and 3.46 g/L, acetic acid between 0.083 and 12.40 g/L, and furfural between 0.004 and 8.73 g/L.

14 Claims, No Drawings

METHOD FOR OBTAINING REINFORCED PACKAGING PAPER

CROSS-REFERENCE TO RELATED APPLICATIONS

This application is a 371 of PCT/ES2021/070778, filed Oct. 27, 2021, which claims the benefit of Spanish Patent Application No. P202031267, filed Dec. 18, 2020, each of which are incorporated herein by reference.

TECHNICAL SECTOR

The present invention corresponds to the paper industry sector, specifically in the manufacture of packaging paper.

BACKGROUND OF THE INVENTION

The main functions of packaging and packaging paper are to protect the product and absorb the stresses generated during its commissioning. Therefore, the main requirement for these papers is mechanical resistance.

Component papers for corrugated cardboard represent the largest percentage of all papers produced in the packaging and packaging sector. This is because it is capable of withstanding high mechanical stress, which allows for great versatility and many other advantages over other materials, such as a very favorable utility/price ratio and sustainability.

The current technique tends to reduce the grammage of the paper that constitutes the corrugated cardboard container. In this way, lighter boxes are obtained, reducing the amount of waste generated. However, this negatively affects the mechanical resistance of the paper, which is proportional to the grammage—that is, to the amount of fiber that makes it up. Therefore, it is necessary to develop strategies that provide resistance to the paper with a lower amount of fiber and keep its performance intact.

In the case of papers made from recycled fibers the problem of lack of resistance in low grammage papers is even more serious because the resistance gradually decreases with the number of recycling cycles of the fibers.

To increase resistance, some attempts have been made by adding synthetic polymers of fossil origin or chemicals. The most common additives are starch, polyacrylamides, alkyl ketene dimer (AKD), alkenyl succinic anhydride (ASA) and polyvinyl alcohol (PVA). However, petroleum derivatives come from non-renewable sources and present environmental problems that need to be avoided.

An alternative to the petroleum-based chemicals used to increase the resistance of paper is the addition of bioproducts of lignocellulosic origin to the fiber suspension with which the paper sheet is made or to the finished fibrous product.

In this sense, the use of nanocrystalline cellulose (NCC) or nanofibrillated cellulose (NFC) mixed with a wide range of paper pulp has been tested. This combination is capable of obtaining interesting increases in tensile strength and compressive strength index (SCT), although the doses in which they must be incorporated make them unsuitable for an industrial process.

The addition of other compounds such as hemicelluloses (xylan and arabinogalactan and galactoglucomannans) obtained from the treatment of lignocellulosic matter requires additional steps in the process, which increase costs.

Other processes directly incorporate lignin or a lignin derivative. Previously, a lignin suspension together with other additives that aim to improve resistance or facilitate the application of lignin.

Kopacic added precipitated lignin (lignosulfonates and Kraft lignin) to the surface of paper and board with subsequent heat treatment to achieve 10-20% compressive strength (SCT) improvements (Kopacic, S. et al. "Technical Lignins and Their Utilization in the Surface Sizing of Paperboard"; (2018) Industrial & Engineering Chemistry Research). Zhongming incorporated methacryloxyethyltimethylammonium chloride (DMC), acrylic acid (AA) and acrylamide (AM) monomers into Kraft lignins from pine pastes to prepare different copolymers, which when added to the paste improved tensile strength and tearing of laboratory sheets by almost 50% (Zhongming, L. et al. "Preparation and Characterization of Softwood Kraft Lignin Copolymers as a Paper Strength Additive". (2018) Polymers 10(7):743).

Patent AU2018202592 B2 improves the water resistance of paper and cardboard by preparing a total or partial solution of solid lignin in an alkaline solvent such as ammonia with which the paper is coated (Size-Press treatment). Subsequently, a heat or acid treatment is carried out.

US2002084045 (A1) treats paper with a composition made from a lignin derivative and an organic solvent such as alcohol. This mixture can be applied in a very diverse way.

WO2006027632 (A2) describes a method of surface treatment of paper using a mixture of solid lignin (lignosulfonate) with starch for treatment in Size-Press, or the use of lignosulfonate sprayed on the surface of the paper.

CN102182112 (B) describes a process that includes the production of ethanol paste, to obtain a solution of hydroxymethyl-lignin to which acrylamide is added.

Apart from the fact that the improvements in the mechanical resistance properties of these processes are limited, it must be noted that the solid lignin is predominantly in the form of lignosulphates. This implies that a sulfur compound is being added to the paper, which can make it unfeasible for certain uses such as food contact.

The benefits improve if residual liquors from the processes for obtaining cellulose pulp are added. These liquors incorporate a complex mixture of wood degradation products with a broad distribution of molecular weights that are beneficial for the resistance properties of the paper, although they require additional additives such as aluminum sulfate or cationic polyacrylamides and to acidify the pH. On the other hand, obtaining cellulose pulp requires the addition of compounds with sulfur, which remain incorporated into the residual liquor and are harmful. The suspended solids contained in these residual liquors are mainly dissolved sulfonated lignins (lignosulfonates and Kraft lignin).

Thus, application U.S. Pat. No. 5,110,414 (A) describes the treatment of paper with the residual liquors that come from the processes for obtaining bisulfite chemical and semichemical pulp, which is mainly made up of lignosulfonates. The possibility of adding polyvinyl alcohol (PVA) to the liquor is also indicated.

Patent CN102061642 (B) uses the concentrated residual liquor of a high-yield bisulfite or alkaline pulp with a low concentration of lignin and hemicelluloses. It is used to prepare a mixture with starch that is used as a size in the manufacture of paper.

Some authors document improvements in compressive strength of between 20 and 30% in commercial papers when residual liquors from pulp production processes with high doses of aluminum sulfate are added (Han K-H and Cho B-U. "Effect of surface sizing of black liquor on properties of corrugated medium". (2016) Biores. 11 (4). 10391-10403). Others report improvements in compressive strength, which are less than 20%, when the sheets of paper are formed from a mixture of recycled pulp (old corrugated cardboard, OCC) and 20% of residual liquor from obtaining pulp (Choi K-H and Cho Cho B-U. "Strength improvement of linerboard by wet-end application of black liquor". (2016) Journal of Korea TAPPI 48(4):78-85).

The main drawback of this alternative is that the process for obtaining cellulose pulp is very aggressive. It causes the solubilization and hydrolysis of a large part of the lignin and carbohydrates towards their respective degradation compounds, such as lignosulfonates, lignosulfonic acids and phenolic compounds (lignin derivatives), and furan derivatives (pentose and hexose degradation). Overall, the efficiency of these liquors is conditioned by the high degree of hydrolysis and degradation of the lignocellulosic compounds, apart from their sulfur content.

Other sectors of the technique have shown interest in lignocellulosic biomass liquors, specifically residues from agriculture and forestry. The polymers that make up this biomass associate with each other, forming a hetero-matrix specifically made up of three main components: cellulose $(C_6H_{10}O_5)x$, hemicellulose $(C_5H_8O_4)m$ and lignin $[C_9H_{10}O_3(OCH)_{0.9-1.7}]n$, in addition to other minority components, such as extractables, terpenes, alkaloids, proteins, phenols, pectins, gums, resins, different fats and ashes.

Due to its structure, lignocellulosic biomass presents a strong recalcitrance or resistance to hydrolysis of polysaccharides. The organized cellulose chains form difficult-to-penetrate crystalline areas alternated with more accessible amorphous regions. These units are, in turn, immersed in a matrix of hemicelluloses and lignin that constitutes an additional barrier for the attack of chemical reagents or hydrolytic enzymes. A pretreatment step is necessarily required to be able to fraction the different structural components and take advantage of them within an integrated biorefinery scheme, and thus maximize the recovery of the original biomass.

In the pretreatment, the lignocellulosic biomass is fractionated, obtaining a residual liquor formed mainly by hemicelluloses, lignin and degradation compounds of the structural components of the raw material used, and a solid residue concentrated in cellulose. In the technique, lignin, hemicelluloses and degradation compounds are recovered from the residual liquor, as well as cellulose from the solid fraction, and are valued for the production of biofuels, chemical intermediates and biomaterials.

To the inventors' knowledge, the residual liquors from the pretreatment of lignocellulosic residues have never been used in the treatment of paper.

The problem of the technique is to improve the efficiency in the use of the residual pulp liquors in the process of strengthening a packaging paper. The solution proposed by the present invention is to use, instead of pulping waste liquor, a lignocellulosic residue pretreatment liquor obtained with an organic solvent-water mixture.

DESCRIPTION OF THE INVENTION

The present invention describes a process for obtaining a reinforced packaging paper, which comprises the application to a packaging paper of a residual liquor obtained from the pre-treatment with alcohol-water of lignocellulosic residues and its subsequent drying. The result is a reinforced paper that exhibits a surprising increase in compressive strength and stiffness.

In a preferable aspect, said drying is a heat treatment at a temperature of 30-70° C. for 15-70 minutes.

Obtaining said lignocellulosic liquor comprises the pretreatment of lignocellulosic residues with mixtures of organic solvents-water in the presence of an acid that acts as a catalyst, under certain reaction conditions. Organic solvents used in lignocellulosic biomass pretreatments are miscible with water and can have low boiling points, such as methanol and ethanol, but also boiling points higher than water, such as ethylene glycol, glycerol, tetrahydrofurfuryl alcohol, and other classes of organic compounds, such as ethers, ketones and phenols. Typically, ethanol/water is used, The residual liquors obtained from the pretreatment of lignocellulosic residues are a mixture of liquid (liquid phase) with solids in suspension (solid phase), which is processed to obtain different proportions of the two phases. Thus, the liquor presents:

A solid phase or solids in suspension (1-70%), formed mainly by lignin and lignin-carbohydrate complexes (LCC, "lignin-carbohydrate complex") because lignin is covalently bound to cellulose and hemicelluloses. It does not have sulfur degradation compounds and the lignin has a high purity, as well as a low molecular weight.

A liquid phase (30-99%) containing hexose and pentose sugars with different degrees of polymerization, low molecular weight hydrolyzed lignin and degradation compounds of the structural components of the raw material used; mainly weak acids such as acetic and furans and phenolic compounds.

In one aspect of the process of the present invention, said pretreatment liquor comprises an amount of glucose between 0.01 g/L and 2.07 g/L; xylose between 0.03 and 14.57 g/L; arabinose between 0.04 and 3.46 g/L; acetic acid between 0.03 g/L and 12.40 g/L; hydroxymethylfurfural (HMF) between 0.01 g/L and 0.90 g/L and furfural between 0.004 g/L and 8.73 g/L.

In a preferred aspect, the glucose concentration is between 0.04 and 2.07 g/L, more preferably between 0.37 and 2.07 g/L, most preferably between 0.37 and 0.62 g/L, most preferably 0.41 g/L.

In a further preferable aspect, the xylose concentration is between 0.3 and 14.57 g/L, more preferable between 3 and 14.57 g/L, more preferable between 3 and 4.37 g/L, even more preferable between 3.41 and 4.37 g/L.

In another preferred aspect, the arabinose concentration is between 0.09 and 3.46 g/L, more preferably between 0.22 and 1.04 g/L.

In another preferred aspect, the concentration of acetic acid is between 0.08 and 12.40 g/L, more preferably between 0.08 and 3.72 g/L, most preferably between 1.15 and 3.72 g/L. L, and even more preferably between 1.48 and 3.72 g/L.

In another preferred aspect, the HMF concentration is between 0.03 and 0.90 g/L, more preferably between 0.03 and 0.27 g/L.

In yet another preferable aspect, the concentration of furfural is between 0.10 and 8.73 g/L, more preferable between 0.10 and 2.61 g/L, most preferable 0.26 and 2.61 g/L.

In a preferred aspect, the application of the residual liquor to the packaging paper is done in a single dose. In another preferable aspect it is applied in successive doses.

In another preferable aspect, the residual liquor application rate is between 4 and 34 $g/m^2$ of paper, preferably between 5 and 30, more preferably between 12 and 29 $g/m^2$.

In a highly preferred aspect, said application is 4, 5, 9, 12, 14, 15, 18, 20, 21, 23, 29 g/m$^2$, or any range between these values, of residual liquor with between 1% and 3% suspended solids, preferably 1%.

In a more preferred aspect, said application is 5, 7, 9, 12, 15, 18, 20, 24, 27, 30 or 34 g/m$^2$, or any range between these values, of residual liquor with between 3% and 10% suspended solids, preferably 5%.

In the present invention, "packaging paper" is understood to mean any raw or white paper or cardboard suitable for manufacturing boxes for packaging. Within raw paper or cardboard, especially facing paper ("Liners") and corrugating paper ("Flutings-medium") according to the European List of Papers for Corrugated Cardboard (Cepi Cointainer Board, 2017). Within the paper for faces, especially raw "Kraftliner" and raw "Testliner"; and within corrugating paper, especially from the "Fluting" semi-chemical or "Fluting-Medium" recycled categories.

In the present invention, "reinforced packaging paper" is understood to mean any packaging paper that has a short compressive strength index value in the cross direction (SCT-CD index) of 5% above the reference value in the European List of Papers for Corrugated Cardboard (Cepi Cointainer Board, 2017).

In the present invention, "pretreatment" is understood as all those processes that allow the conditioning and transformation of lignocellulosic biomass to take advantage of its structural components and improve its recovery in biorefinery processes. Specifically, pretreatment is the process by which lignocellulose is treated in an acid medium to break the cell walls and proceed to a partial depolymerization of it for a better use later.

In the present invention, "residual liquor" is understood to mean the liquid phase with solids in suspension obtained from said pretreatment once the solid residue has been removed from it, which is retained on a metal mesh typically 0.40 mm thick, a weft and a warp of 24 threads and 32 threads per 10 mm, respectively. The weft and warp threads have a typical thickness of 0.17 mm and 0.16 mm, respectively.

In the present invention, "lignocellulosic residues" are understood to mean the biomass obtained from agroforestry material, preferably residues from agriculture and forestry.

A more preferable aspect of the invention is that said agricultural and/or forestry biomass is cereal straw, thistle stems (*Cynara Carduncul͏us* L.) or corn stover, still more preferably wheat straw.

During the pretreatment of the lignocellulosic residues, the reaction temperature varies between 100 and 250° C., typically 200° C. To work at the lowest possible temperature, acid catalysts are added to the reaction medium, which cause an increase in the rate of delignification and hydrolysis of the hemicellulose fraction. Among the acid catalysts used are mineral (hydrochloric, sulfuric and phosphoric) and organic (methanoic, ethanoic, heptanoic or nonanoic). Sulfuric acid is the most commonly used catalyst, typically in a concentration ranging from 0.5 to 1.75% on a dry basis.

In a preferred embodiment, the pretreatment residual liquor can be applied during papermaking by various means, or onto the surface of the finished paper by spraying, roller coating, knife coating, and dipping.

The lignocellulosic residual liquor used in the present invention is biosustainable, does not require additives or intensive processing after obtaining it beyond concentration techniques and recovery of the organic solvent—which decreases the costs of the process in general. On the contrary, prior art technologies for improving the resistance of papers include expensive chemical additives and, in many cases, from non-renewable sources such as oil.

The use of lignocellulosic residual liquor allows reducing the consumption of vegetable fiber in the reinforcement of the paper because the liquor itself can replace a part of this fiber, obtaining the desired grammage. In this sense, the present invention allows up to an application of 30 g/m$^2$ of lignocellulosic waste liquor, whereas the art only describes an application of pulping waste liquor up to about 15 g/m$^2$.

The compressive strength of the paper increases proportionally to the amount of residual liquor added, which makes it possible to design the type of paper according to the dose of product applied.

The packaging papers treated with the process of the invention show a surprising improvement in compressive strength, both in virgin and recycled fiber paper, with respect to those achieved with other products of the technique. The results have shown very significant increases in CMT-30, CCT-30 and SCT-CD.

This increase in compressive strength is essential, since the main stress to which corrugated cardboard boxes are subjected during transport and storage is compression due to the weight of the containers superimposed on them. The load is distributed evenly between the vertical walls of the box and therefore it is necessary that the component papers of the cardboard have sufficient compressive strength in a direction parallel to its surface to avoid its deformation and crushing of the box.

The treatment of packaging paper with the method of the invention significantly increases the flexural stiffness of the paper, which allows it to withstand stress without deforming. This property increases linearly with the applied dose.

The absence of sulfur also makes the reinforced paper of the present invention suitable for all types of uses, including food.

The porosity of the paper is maintained, or increases, when the dose and the suspended solids present in the liquor are low (1%) and it is slightly reduced when the concentration of solids in the liquor is 5% and the dose applied on the paper is high, regardless of the paper source.

EXAMPLES

Example 1. Preparation of Residual Pretreatment Liquor from Lignocellulosic Residues The lignocellulosic residues used in this example were wheat straw (WS), *Cynara Cardunculus* (thistle), corn stubble (CS) and rice straw (RS), pretreated under different reaction conditions, using an ethanol-water mixture and adding sulfuric acid as a catalyst (1% w/w on a dry basis). Table 1 shows the maximum and minimum values used for the reaction variables: time (min), temperature (° C.), liquid-solid ratio (L/kg) and ethanol content (v/v).

TABLE 1

Pretreatment conditions.

| Variable | Minimum | Maximum |
|---|---|---|
| Time (min) | 45 | 120 |
| Temperature (° C.) | 130 | 190 |
| L/S ratio (L/kg) | 20 | 30 |
| Ethanol (v/v) | 0.25 | 0.33 |

Once the reaction was finished and for all the preparations, the reactor was cooled by circulating cold water through the cooling jacket until it reached room temperature. The digester contents were then recovered in a discharge tank and filtered to separate the solid pre-treated material from the liquid with suspended solids through a 0.40 mm thick mesh, a 24-thread warp and 32-thread weft and per 10 mm, respectively. The warp and weft threads had a thickness of 0.17 mm and 0.16 mm, respectively.

The liquid phase of the residual liquors was characterized using methodology developed by NREL (Sluiter, A et al. "Determination of Sugars, Byproducts, and Degradation Products in Liquid Fraction Process Samples". (2008) Proce. Lab. Anal. Procedure NREL/TP-510-42623 1-14. https://doi.org/TP-510-42623), obtaining the content of glucose, xylose, arabinose, acetic acid, hidoxymethylfurfural (HMF) and furfural.

Table 2 shows the minimum and maximum values of each component, obtained by analyzing each of the residual liquors obtained.

TABLE 2

Maximum and minimum values of the residual liquors obtained.

| Pretreated residue | Component Range (g/L) | Glucose | Xylose | Arabinose | Acetic acid | HMF | Furfural |
|---|---|---|---|---|---|---|---|
| WS | Minimum | 0.04 | 0.312 | 0.093 | 0.083 | 0.007 | 0.004 |
| (22 samples) | Maximum | 0.622 | 4.370 | 1.039 | 3.720 | 0.270 | 2.618 |
| Thistle | Minimum | 0.007 | 0.133 | 0.035 | 0.051 | 0.007 | 0.007 |
| (17 samples) | Maximum | 0.056 | 0.769 | 0.442 | 1.440 | 0.184 | 0.763 |
| CS | Minimum | 0.045 | 0.027 | 0.330 | 0.031 | 0.073 | 0.016 |
| (6 samples) | Maximum | 0.223 | 0.470 | 0.486 | 0.187 | 0.107 | 0.207 |
| RS | Minimum | 0.090 | 0.168 | 0.186 | 0.042 | 0.005 | 0.024 |
| (8 samples) | Maximum | 0.151 | 0.823 | 0.421 | 0.58 | 0.079 | 0.503 |

WS: wheat straw; Thistle: *Cynara Cardunculus*; CS: Corn stubble; RS: rice straw.

All the analyzed residual liquors presented in solution sugars (glucose, xylose and arabinose) that come from the cellulose and hemicelluloses of the lignocellulosic residues, and degradation compounds of these components (acetic acid, HMF and furfural). They also had a high xylose and low glucose content. This is because the pretreatment conditions were optimized to obtain a solid fraction rich in cellulose.

Of all the treated residues, wheat straw presented the best response to hydrolysis of the hemicellulose fraction, which is evidenced in the high contents of xylose, acetic acid and furfural found, degradation compounds of this fraction. Therefore, this material is the most suitable for obtaining a residual pretreatment liquor suitable for its application as a reinforcing agent in packaging papers.

The liquors obtained were concentrated by filtration and/or distillation in a rotary evaporator to thus recover the organic solvent.

A concentration of components was obtained in the liquid fraction of the wheat straw substrate of glucose between 0.04 and 2.07%, xylose between 0.31 and 14.57%, arabinose between 0.09 and 3.46%, acetic acid between 0.083 and 12.40%, hydroxymethyl-furfural (HMF) between 0.01 g/L and 0.90 g/L, and furfural between 0.004 and 8.73%, all percentages expressed in total weight/volume of the liquid fraction. They also presented suspended solids consisting essentially of lignin and lignin-carbohydrate complexes.

Example 2. Treatment of Corrugating Paper with Residual Liquor by Immersion 2 commercial medium papers have been chosen, used in the manufacture of corrugated cardboard. One made with semi-chemical virgin fiber and without treatment (V-0) with a nominal weight of 150 g/m$^2$ and the other made with recycled fiber (R-0) with a nominal weight of 135 g/m$^2$.

A pretreatment liquor was used from wheat straw with a mixture of ethanol/water (0.25% (v/v)) and with 1% sulfuric acid as a catalyst, a liquid/solid ratio of 30 L/kg and an H factor of 9012, for 120 min at 190° C. maximum temperature, according to the previous example. The residual liquor obtained presented a liquid phase containing glucose (0.37 g/L), xylose (3.02 g/L), arabinose (0.22 g/L), acetic acid (1.15 g/L), HMF (0.025 g/L) and furfural (0.258 g/L) and a solid phase with suspended solids consisting essentially of lignin and lignin-carbohydrate complexes.

This pretreatment residual liquor was applied with two concentrations of suspended solids, 1% (LR1) and 5% (LR5). The form of application was by complete immersion of the paper in the liquor for 24 h. After that time, the papers were removed, and the excess liquor was removed using a roller. The papers were submitted to a drying heat treatment by direct contact with a hot polished surface at 35° C. for 1 h.

Prior to carrying out the tests for the physical-mechanical characterization of its properties, the paper samples were conditioned in a standardized laboratory atmosphere for 24 h (50±2% relative humidity and 23±1° C. temperature). During the execution of the tests, the sheets of paper and the test tubes were kept in the laboratory atmosphere. The laboratory atmosphere complies with the requirements established in ISO 187.

The properties that were characterized on the original paper, on the control and on the treated papers, are indicated below:

Grammage (ISO 536);

Flat crushing resistance of a corrugated test piece in standard conditioning (CMT30) and CMT index (ISO 7263);

Resistance to crushing on the edge of a corrugated test piece in standard conditioning (CCT30) and CCT index (ISO 16945);

Short compressive strength in the cross direction (SCT-CD) and SCT index (ISO 9895).

The results of the original semichemical virgin fiber paper (V-0) and recycled fiber (R-0), and of the papers reinforced with the residual liquors by immersion with the two concentrations of suspended solids of 1% (LR1) and of 5% (LR5), are collected in Table 3.

TABLE 3

Results for concentration of solids in suspension of LR1 and LR5.

| Sample | V-0 | V-LR1 | V-LR5 | R-0 | R-LR1 | R-LR5 |
|---|---|---|---|---|---|---|
| Applied dose (g of liquor/m$^2$) | 0 | 21 | 30 | 0 | 12 | 34 |
| Final grammage (g/m2) | 154 | 175 | 185 | 136 | 148 | 170 |
| CMT-30 (N) | 519 | 718 | 662 | 284 | 451 | 501 |
| CCT-30 (kN/m) | 3.41 | 5.26 | 5.60 | 2.30 | 3.38 | 4.07 |
| SCT-CD (kN/m) | 4.974 | 5.490 | 5.437 | 2.960 | 3.92 | 4.448 |

It is verified that the treatment with the residual liquor in both cases, LR1 and LR5, produces an increase in the grammage of the paper, being greater when the concentration of solids in suspension of the liquor increases.

The compressive strength of virgin fiber paper increases under both treatment conditions. Increases of CMT-30 of 38%, of CCT-30 of 29% and of 11% of SCT are achieved, with respect to the original value, when the liquor is applied with a solids concentration of 1% (LR1). The resistance increases achieved with liquor (LR5) are similar: for CMT-30 of 28%, for CCT-30 of 37% and for SCT of 9%.

For recycled fiber, the compressive strength of the paper seems to increase with the dose of LR attached to the paper. Increases in CMT-30 of 59%, CCT-30 of 47% and SCT of 33% are achieved, with respect to the original value, when the LR1 liquor is applied. The strength increases achieved with the LR5 liquor are greater; 76%, 77% and 50%, for CMT-30, CCT-30 and SCT, respectively.

Also, the compressive strength has improved in percentage more in the recycled fiber paper than in the virgin fiber paper. This is possibly due to the fact that the recycled fiber source paper had very high initial strength values.

Example 3. Corrugating Paper Made from Semi-Chemical Virgin Fiber

A commercial "semichemical fluting" corrugating paper, type Semichemical 1, was chosen from the European List of Papers for Corrugated Cardboard (Cepi Cointainer Board, 2017), usually used in the manufacture of corrugated cardboard for high-resistance containers such as those intended for transport of fruit and vegetable products. The original paper, without treatment (V-0), had a nominal weight of 150 g/m$^2$.

The residual liquor obtained presented a liquid phase characterized by NREL procedures, as referenced in Example 1, which contained cellobiose (1.64 g/L), galacturonic acid (0.45 g/L), glucose (0.41 g/L), galactose (0.34 g/L), xylose (3.41 g/L), arabinose (1.48 g/L), formic acid (0.98 g/L), acetic acid (0.27 g/L), HMF (0.022 g/L) and furfural (0.098 g/L) and a solid phase with suspended solids consisting essentially of lignin and lignin-carbohydrate complexes.

Residual liquor from the wheat straw pretreatment was applied on the surface of this paper at a suspended solids concentration of 1% (LR1) and a solids concentration of 5% (LR2).

The form of application was by spraying. The paper sample was sprayed until it was verified that the entire surface of the paper was completely covered by the liquor, and it was subsequently subjected to a direct contact drying heat treatment with a hot polished surface at 60° C. for 20 min.

To achieve increasing doses of residual liquor applied on the paper, the previous steps were repeated up to 5 times; that is, paper samples have been obtained with 1 spray (1P), 2 sprays (2P), and thus up to 5 sprays (5P) of residual liquor.

A control test (C) was carried out for each execution example with the hydroalcoholic mixture used in the pretreatment.

Prior to carrying out the physical-mechanical characterization tests of the paper properties, the paper samples were conditioned in the standardized atmosphere of the laboratory for 24 h (50±2% relative humidity and room temperature). During the execution of the tests, the sheets of paper and the test specimens were kept in the laboratory atmosphere, complying with the requirements established in the ISO 187 standard.

The properties that were characterized in the original paper, in the control sample and in the treated papers, are indicated below:

Grammage (ISO 536);

Sheet thickness (ISO 534);

Resistance to the passage of air, or porosity, Gurley method (ISO 5636-5);

Flat crushing resistance of a corrugated test piece in standard conditioning (CMT30) and CMT index (ISO 7263);

Resistance to crushing on the edge of a corrugated test piece in standard conditioning (CCT30) and CCT index (ISO 16945);

Short compressive strength in the cross direction (SCT-CD) and SCT index (ISO 9895);

Flexural strength in cross direction (ISO 2493-1);

The indexes of the mechanical resistance properties are obtained by dividing these by the grammage.

The results of the "semichemical fluting" paper (V-0), of the control paper (V-C) and of the papers reinforced with different doses of residual liquor (1P, 2P, 3P, 4P and 5P) using two concentrations of solids in suspension of 1% (LR1) and 5% (LR5), are collected in Tables 4 and 5.

TABLE 4

Results for LR1.

| Sample | V-0 | V-C | V-1P-LR1 | V-2P-LR1 | V-3P-LR1 | V-4P-LR1 | V-5P-LR1 |
|---|---|---|---|---|---|---|---|
| Applied dose (g of liquor/m$^2$) | 0 | 0 | 5 | 14 | 21 | 23 | 29 |
| Final grammage (g/m2) | 158 | 162 | 165 | 174 | 181 | 184 | 190 |
| Thickness (μm) | 231 | 251 | 259 | 269 | 273 | 269 | 278 |

TABLE 4-continued

Results for LR1.

| Sample | V-0 | V-C | V-1P-LR1 | V-2P-LR1 | V-3P-LR1 | V-4P-LR1 | V-5P-LR1 |
|---|---|---|---|---|---|---|---|
| Gurley air resistance (s) | 119 | 72 | 89 | 76 | 67 | 61 | 77 |
| CMT-30 (N) | 520 | 500 | 570 | 700 | 710 | 750 | 725 |
| CMT index (N · $m^2$/g) | 3.30 | 3.10 | 3.44 | 4.03 | 3.92 | 4.07 | 3.81 |
| CCT-30 (kN/m) | 4.28 | 3.89 | 4.50 | 4.79 | 5.24 | 5.20 | 5.24 |
| CCT index (N · m/g) | 27.0 | 24.1 | 27.2 | 27.5 | 28.9 | 28.2 | 27.6 |
| SCT-CD (kN/m) | 4.425 | 4.303 | 4.612 | 5.087 | 5.137 | 5.662 | 5.515 |
| Index SCT-CD-(N · m/g) | 27.9 | 26.6 | 27.9 | 29.2 | 28.3 | 30.7 | 29.0 |
| Flexural strength-ST- (mN) | 19 | 20 | 23 | 26 | 29 | 32 | 30 |

TABLE 5

Results for LR5.

| Sample | V-0 | V-C | V-1P-LR5 | V-2P-LR5 | V-3P-LR5 | V-4P-LR5 | V-5P-LR5 |
|---|---|---|---|---|---|---|---|
| Applied dose (g of liquor/$m^2$) | 0 | 0 | 7 | 12 | 21 | 24 | 27 |
| Final grammage (g/m2) | 158 | 156 | 167 | 173 | 182 | 184 | 187 |
| Thickness (μm) | 232 | 251 | 247 | 255 | 276 | 267 | 282 |
| Gurley air resistance (s) | 119 | 61 | 101 | 92 | 140 | 131 | 119 |
| CMT-30 (N) | 520 | 485 | 625 | 660 | 745 | 750 | 745 |
| CMT index ($Nm^2$/g) | 3.30 | 3.10 | 3.74 | 3.80 | 4.07 | 4.09 | 3.98 |
| CCT-30 (kN/m) | 4.28 | 3.86 | 4.59 | 4.85 | 5.43 | 5.70 | 5.84 |
| CCT index (N · m/g) | 27.0 | 24.7 | 27.6 | 28.0 | 29.8 | 31.0 | 31.2 |
| SCT-CD (kN/m) | 4.425 | 4.137 | 4.717 | 5.365 | 5.598 | 6.072 | 6.602 |
| Index SCT-CD-(N · m/g) | 27.9 | 26.5 | 28.3 | 31.0 | 30.7 | 33.0 | 35.3 |
| Flexural strength-ST- (mN) | 19 | 18 | 24 | 32 | 39 | 40 | 33 |

Regarding the original paper, it is verified that the control experiences a decrease in its compressive strength in the three measured variables (CMT-30, CCT-30 and SCT-CD), as well as in the resistance to the passage of air. The flexural strength (stiffness) residues constant.

It can be concluded from the control results that the control ethanol-water mixture does not by itself improve the mechanical resistance properties of the paper.

The treatment with the residual liquor in both conditions (LR1 and LR5) produces an increase in the thickness of the paper. The porosity of the paper increases in LR1 conditions (the resistance to the passage of air is reduced) due to the wetting of the paper, which makes the structure of the sheet more open. However, if the applied dose is greater than 15 g/$m^2$ of LR5 the resistance to the passage of air increases slightly.

It is observed that the compressive strength of paper increases linearly with the amount of liquor retained on its surface. Increases of CMT-30 of up to 40%, of CCT-30 of up to 36% and of SCT of up to 50% with respect to the original value are achieved when the maximum dose of LR5 liquor is applied. The increases achieved with the LR1 liquor are slightly less. It is necessary to highlight that the values of the CMT, CCT and SCT indexes are surprisingly above those stipulated in quality guides for this type of paper, such as the European List of Papers for Corrugated Cardboard (Cepi Cointainer Board, 2017).

The stiffness of the paper increases considerably in both treatment conditions. It can be seen that, in some embodiments of the invention, the flexural strength source value was doubled (e.g., V-3P-LR5 and V-4P-LR5).

Example 4. Recycled Fiber Fluting Paper

The selected paper was a commercial "recycled fluting-medium" paper type Medium high performance 2 from the European List of Papers for Corrugated Cardboard (Cepi Cointainer Board, 2017). It is typically used for the manufacture of corrugated cardboard for high-resistance containers, such as those intended for the transport of fruits and vegetables. The paper is made exclusively with recycled fiber. The source paper (R-0) has a nominal weight of 150 g/$m^2$.

Prior to carrying out the tests to determine the physical-mechanical characteristics, the paper samples were conditioned in the standardized atmosphere of the laboratory for 24 h (50±2% relative humidity and room temperature). During the execution of the tests, the sheets of paper and the test specimens were kept in the laboratory atmosphere, complying with the requirements of the ISO 187 standard.

Liquors LR1 and LR5 from the previous example were used.

A control test (C) was carried out for each execution example with the hydroalcoholic mixture used in the pretreatment. In the original paper, in the control paper and in the treated papers, the same properties were determined as in the previous example.

The results of the "recycled fluting-medium" paper (R-0), of the control (R-C) and of those reinforced with different doses of residual liquor (1P, 2P, 3P, 4P and 5P) using LR1 and LR5, are collected in Tables 6 and 7.

TABLE 6

Results for LR1.

| Sample | R-0 | R-C | R-1P-LR1 | R-2P-LR1 | R-3P-LR1 | R-4P-LR1 | R-5P-LR1 |
|---|---|---|---|---|---|---|---|
| Applied dose (g of liquor/m$^2$) | 0 | 0 | 4 | 9 | 15 | 18 | 20 |
| Final grammage (g/m$^2$) | 153 | 153 | 155 | 161 | 168 | 171 | 173 |
| Thickness (μm) | 208 | 228 | 227 | 234 | 244 | 243 | 251 |
| Gurley air resistance (s) | 39 | 31 | 30 | 33 | 34 | 32 | 37 |
| CMT-30 (N) | 360 | 330 | 360 | 380 | 445 | 475 | 575 |
| CMT index (Nm$^2$/g) | 2.35 | 2.17 | 2.31 | 2.34 | 2.65 | 2.79 | 3.33 |
| CCT-30 (kN/m) | 3.41 | 3.04 | 3.39 | 3.54 | 4.04 | 4.10 | 4.50 |
| CCT index (N · m/g) | 22.3 | 19.8 | 21.8 | 22.0 | 24.0 | 24.0 | 26.0 |
| SCT-CD (kN/m) | 3.475 | 3.832 | 4.066 | 4.179 | 4.622 | 4.608 | 5.066 |
| Index SCT-CD-(N · m/g) | 22.7 | 25.0 | 26.1 | 26.0 | 27.5 | 27.0 | 29.3 |
| Flexural strength-ST- (mN) | 18 | 19 | 21 | 23 | 26 | 27 | 28 |

TABLE 7

Results for LR5.

| Sample | R-0 | R-C | R-1P-LR5 | R-2P-LR5 | R-3P-LR5 | R-4P-LR5 | R-5P-LR5 |
|---|---|---|---|---|---|---|---|
| Applied dose (g of liquor/m2) | 0 | 0 | 5 | 9 | 15 | 18 | 20 |
| Final grammage (g/m2) | 153 | 150 | 157 | 161 | 168 | 170 | 172 |
| Thickness (μm) | 208 | 229 | 228 | 234 | 245 | 247 | 256 |
| Resistance to the passage of air Gurley (s/100 cm$^3$) | 39 | 26 | 51 | 54 | 68 | 88 | 121 |
| CMT (N) | 360 | 335 | 360 | 445 | 470 | 525 | 515 |
| CMT Index (N · m2/g) | 235 | 2.24 | 2.29 | 2.76 | 2.81 | 3.06 | 3.01 |
| CCT (kN/m) | 3.41 | 2.84 | 3.37 | 3.80 | 3.99 | 4.39 | 4.40 |
| CCT index (N · m/g) | 22.3 | 19.0 | 21.4 | 23.6 | 23.8 | 25.5 | 25.8 |
| SCT-CD (kN/m) | 3.475 | 3.530 | 4.279 | 4.401 | 4.815 | 5.022 | 4.808 |
| Indice SCT-CD- (N · m/g) | 22.7 | 23.6 | 27.2 | 27.4 | 28.7 | 29.2 | 28.2 |
| Flexural strength-ST (mN) | 18 | 20 | 22 | 25 | 28 | 26 | 28 |

The control test revealed that the ethanol-water mixture used in the pretreatment slightly reduces the mechanical resistance properties of the paper, with the exception of stiffness and SCT, which remain approximately at the original values.

The treatment with the residual liquor in both cases, LR1 and LR5, produces an increase in the thickness of the paper. The resistance to the passage of air is maintained at the original values when the paper is treated with LR1 liquor regardless of the applied dose. However, when it is treated with LR5 liquor, the resistance to the passage of air increases proportionally with the applied dose.

It is observed that the compressive strength of the paper increases linearly with the amount of liquor retained by the paper (g/m$^2$), in the three properties evaluated. Slightly higher increases were achieved (dose 20 g/m$^2$) for these properties when LR1 was applied, with increases of CMT-30 of up to 60%, of CCT-30 of up to 32% and of SCT of up to 46%, with respect to the original value; while for LR5, these values were 46%, 30% and 40%, respectively.

Thus, increases in paper stiffness of up to 50% of the original value were achieved; which is very interesting because recycled papers often have stiffness problems.

Example 5. Comparative Results with the Use of Residual Liquors without Additives from the Process for Obtaining Cellulose Pulp (Kraft Process)

Next, the results of the invention are compared with those of the process for reinforcing packaging papers described in the following publications:

(i) Han, KM, & Cho, BU (2016). Effect of surface sizing of black liquor on properties of corrugated medium. BioResources, 11(4), 10391-10403.

(ii) Choi K-H and Cho Cho B-U. (2016) "Strength improvement of linerboard by wet-end application of black liquor". Journal of Korea TAPPI 48(4):78-85).

From both documents (i) and (ii) the best described result without additives has been taken. The comparison is conditioned to the results of the few reinforcement parameters that they provide.

Document (i) applies to the paper about 9 g/m$^2$ of Kraft residual liquor (40% suspended solids) in Size-press. The most similar conditions in the present invention are the spray application on a semichemical "fluting" corrugating paper of a pretreatment residual liquor with 5% solids in suspension and a dosage of 12 g/m$^2$ (V-2P-LR5, Table 5, Example 3).

Document (ii) forms the paper sheets from a mixture of recycled pulp (OCC) and applies 20% Kraft residual liquor (suspended solids: 39.2%). The most similar conditions in the present invention are the application by immersion in a paper made with recycled fiber (R) of a pretreatment residual liquor with 1% solids in suspension and dosage of 12 g/m$^2$ (R-LR1, Table 3, Example 2).

Table 8 shows the comparative results between both documents and the present invention. The variation of the resistance properties is shown as a percentage of improvement (+) or decrease (−) with respect to the control value.

TABLE 8

Comparison between the present invention and the state of the art.

| Kraft (document i) | | Example 3 (LR5) | |
|---|---|---|---|
| Property | Variation | Property | Variation |
| Compression Index-MD (RCT) (Nm/g) | +8% | CMT (N) | +36% |
| | | CCT (kN/m) | +26% |
| | | SCT-CD (kN/m) | +30% |
| Number of double folds | +1.9% | Flexural strength-ST (mN) | +77% |
| **Kraft (document ii)** | | **Example 2 (LR2)** | |
| MD Compression Index (RCT) (Nm/g) | −14% | CMT (N) | +58% |
| | | CCT (kN/m) | +47% |
| | | SCT-CD (kN/m) | +32% |

It is observed that the compressive strength in the reinforced papers of document (i) does not increase significantly when only Kraft residual liquor is applied and that document (ii) even has a negative result, unlike the application of the lignocellulosic residual liquor of the present invention.

Example 6. Comparative Results with the Use of Residual Liquors with Additives from the Process for Obtaining Cellulose Pulp (Kraft Process)

The technique improves the results of the previous example for obtaining reinforced papers by adding additives to the residual liquors from the cellulose pulp manufacturing processes.

Both the raw materials and the chemical reagents used to obtain said liquors are different from the liquor used in the present invention.

Kraft lignins contain sulfur (1-2%), a large number of condensed structures and a high percentage of phenolic hydroxyl groups, while the lignins obtained with the method of the invention do not have sulfur, they have a higher relative amount of hydroxyl groups. phenolics and a more condensed structure (Kubo, S., Kadla, J. F., 2004. Poly (ethylene oxide)/organosolv lignin blends: Relationship between thermal properties, chemical structure, and blend behavior". Macromolecules 37, 6904-6911).

The fraction of carbohydrates dissolved in the pretreatment liquors of the present invention is made up of hexose and pentose type sugars with different degrees of polymerization, and degradation compounds, mainly weak acids such as acetic and levulinic acids, furans, and phenolic compounds (Vergara, P. et al., 2019. "Liquor re-use strategy in lignocellulosic biomass fractionation with ethanol-water mixtures". Bioresour. Technol. 280, 396-403). On the contrary, in Kraft liqueurs the carbohydrates present more degraded forms as they have undergone a more severe treatment (Niemelä, K., & Alén, R., 1999. "Characterization of pulping liquors. In Analytical methods in wood chemistry, pulping, and papermaking" (pp. 193-231). Springer, Berlin, Heidelberg).

From both documents (i) and (ii) of the previous example, the best result described with additives has been taken. The comparison is conditioned to the results of the few reinforcement parameters that they provide.

Kraft residual liquors from the art and compared documents typically contain about 39% suspended solids, much higher than the 1 and 5% used by the invention in the previous examples.

The document (i) applies to the paper approximately 10 g/m$^2$ Kraft residual liquor (40% slurry solids) and 2.5% alumina sulfate in Size-press. The most similar conditions in the present invention are the spray application on a semi-chemical "fluting" corrugating paper of a pretreatment residual liquor with 5% solids in suspension and dosage of 12 g/m$^2$ (V-2P-LR5, Table 5, Example 3).

Document (ii) forms the paper sheets from a mixture of recycled pulp (OCC) and applies 20% Kraft residual liquor (suspended solids: 39.2%) and 3% cationic polyacrylamide, adjusting the pH to 6.4. The most similar conditions in the present invention are the application by immersion in a paper made with recycled fiber (R) of a pretreatment residual liquor with 1% solids in suspension and dosage of 12 g/m$^2$ (R-LR1, Table 3, Example 2).

Table 9 shows the comparative results between both documents and the present invention. The values of increase of the resistance properties are shown as a percentage of improvement with respect to the control value.

TABLE 9

Comparison between the present invention and the state of the art.

| Kraft (document i) | | Example 3 (LR5) | |
|---|---|---|---|
| Property | Increment (%) | Property | Increment (%) |
| Compression Index-MD (RCT) (Nm/g) | +28 | CMT (N) | +36 |
| | | CCT (kN/m) | +26 |
| | | SCT-CD (kN/m) | +30 |
| Number of double folds | +8 | Flexural strength-ST (mN) | +77 |
| **Kraft (document ii)** | | **Example 2 (LR1)** | |
| Compression Index-MD (RCT) (Nm/g) | +14 | CMT (N) | +58 |
| | | CCT (kN/m) | +47 |
| | | SCT-CD (kN/m) | +32 |

With respect to the best results of document (i) for similar doses of residual liquor applied, it is observed that the improvement of the compressive strength of the reinforced paper of the present invention is similar or greater.

However, the results that accept the comparison are not the best of the invention. The present invention accepts doses greater than 12 g/m$^2$, being that the results increase proportionally with the dose applied as demonstrated in Examples 2, 3 and 4. The prior art documents (i) and (ii) do not offer results at higher doses possibly due to the limitation of the efficiency of the liquor on the papers. In both documents, a liquor with a large amount of solids in suspension is applied, which can really mark the maximum application, while the lignocellulosic liquor of the invention seems to allow a greater capacity for modifying the papers.

The invention claimed is:

1. A procedure for obtaining a reinforced packaging paper comprising:
  - a) applying a residual liquor obtained from alcohol-water pretreatment of lignocellulosic residues on a packaging paper, wherein said residual liquor comprises:
    - a solid fraction in suspension of 1-70% by weight/volume with respect to the total, comprising lignin and lignin-carbohydrate complexes and no sulphur degradation compounds; and
    - a liquid fraction of 30-99% by weight/volume with respect to the total, containing glucose between 0.04 and 2.07 g/L, xylose between 0.31 and 14.57 g/L, arabinose between 0.09 and 3.46 g/L, acetic acid between 0.083 and 12.40 g/L, furfural between 0.004 and 8.73 g/L and b) drying the packaging paper obtained in step a), to obtain the reinforced packaging paper;

wherein, prior to step a), the pretreatment of lignocellulosic residues comprises the steps of:

(i) pretreating the lignocellulosic residues in a mixture of alcohol and water in the presence of an acid that acts as a catalyst to obtain a liquor and the solid pre-treated residues;

(ii) separating the liquor of (i) from the solid pre-treated residues; and (iii) concentrating the liquor of (ii) to recover the alcohol and to obtain the residual liquor applied in step a).

2. The procedure according to claim 1, wherein the alcohol-water pretreatment is an ethanol-water pretreatment.

3. The procedure according to claim 1, wherein the glucose concentration is between 0.37 and 2.07 g/L.

4. The procedure according to claim 3, wherein the glucose concentration is between 0.37 and 0.62 g/L.

5. The procedure according to claim 1, wherein the xylose concentration is between 3 and 14.57 g/L.

6. The procedure according to claim 5, wherein the xylose concentration is between 3 and 4.37 g/L.

7. The procedure according to claim 5, wherein the xylose concentration is between 3.41 and 4.37 g/L.

8. The procedure according to claim 1, wherein the suspended solid fraction contains solids in a percentage between 1 and 10% with respect to the total weight of the residual liquor.

9. The procedure according to claim 1, wherein the application in step a) is between 4 and 34 $g/m^2$ of residual liquor.

10. The procedure according to claim 9, wherein the application in step a) is between 5 and 30 $g/m^2$ of residual liquor.

11. The procedure according to claim 9, wherein the application in step a) is between 15-25 $g/m^2$, with a residual liquor containing between 1 and 3% solids in suspension.

12. The procedure according to claim 11, wherein the application in step a) is 20 $g/m^2$, with a residual liquor containing 1% solids in suspension.

13. The procedure according to claim 9, wherein the application in step a) is between 20-30 $g/m^2$ with residual liquor containing between 3 and 10% suspended solids.

14. The procedure according to claim 13, wherein the application in step a) is between 20-30 $g/m^2$ with a residual liquor containing 5% suspended solids.

* * * * *